Patented Nov. 13, 1928.

1,691,066

UNITED STATES PATENT OFFICE.

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE.

DEHYDRATION PRODUCTS OF PINE OIL AND PROCESS OF PRODUCING SAME.

No Drawing.    Application filed July 20, 1926.  Serial No. 123,813.

In the processes for the extraction of rosin from resinous wood, there are also recovered substantial quantities of pine oil and turpentine. Since turpentine is usually more valuable than pine oil, and since other operations carried on by the producer may require the use of larger quantities of turpentine, for solvent or other purposes, than is produced in the wood extracting process, there may be no use, or but a limited use, for pine oil; or, due to temporary market conditions, there may be little demand for pine oil and a big demand for turpentine. I have discovered that pine oil may be converted into a substance that may be used, for most or all purposes, as a substitute for turpentine, and that has, in general, solvent properties superior to those of turpentine, although inferior to those of pine oil.

I have also discovered that my process may be so carried out as to produce a limited, but substantial, amount of other products, particularly borneol, which may have, as borneol has, a higher value per unit weight than either pine oil, or the turpentine substitute, or turpentine.

My process comprises the dehydration of pine oil. The preferred method of executing my process involves the addition of the halogen to the pine oil, followed by slow distillation, preferably (but not necessarily) with the introduction of steam; the distillate being the turpentine substitute above mentioned. The halogens that I have found most effective as dehydrating agents are iodin, chlorin and bromin, but iodin is preferred. Dehydration with a halogen is carried out, preferably, by addition of the halogen, followed by distillation, as above stated; but it is also possible to add the halogen and then reflux for a time. The advantage of the use of a halogen is that the high boiling residue contains a greater proportion of the more valuable constituents than is obtained by the use of any other dehydrating agent, with the possible exception of argillaceous earths, such as fuller's earth, or of silicious earths such as kieselguhr, or of activated carbon. Probably the most valuable of these constituents is borneol. Iodin gives the maximum possible amount of selective dehydration between the tertiary and secondary alcohols, i. e., it yields a residue containing a greater proportion of borneol and fenchyl alcohol than can be obtained by using other reagents. In view, therefore, of the peculiar utility of a halogen as a dehydrating agent for pine oil, I have claimed it herein specifically and do not intend to cover the other dehydrating agents herein specified, which are made the subject of a separate application filed of even date herewith, Serial No. 123,814, filed July 20, 1926.

The chief constituent of pine oil is alpha-terpineol, but considerable amounts of other oxygenated bodies, as well as a small proportion of terpene hydrocarbons, are also present. The dehydrating agent splits off chemically combined water, forming terpene hydrocarbons that are isomeric with pinene. The main reaction may be represented thus:

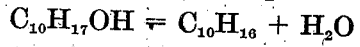
$$C_{10}H_{17}OH \rightleftharpoons C_{10}H_{16} + H_2O$$

Dipentene is the most important hydrocarbon that is formed, but other terpene hydrocarbons, such as terpinene and limonene, are present. In addition, small amounts of paraffin and aromatic hydrocarbons may be formed in certain cases.

As above stated, the halogen is added to the pine oil, and the hydrocarbons are then slowly distilled off through a fractionating column substantially as rapidly as they are formed. In case the halogen chosen is chlorin or bromin, it may be desirable to dissolve the halogen in a small amount of an inert solvent, such as carbon tetrachloride, previous to adding it to the pine oil. Dehydration occurs more readily with iodin than with any of the other halogens. From sixty to eighty-five per cent of the pine oil is distilled over. The distillate consists chiefly of the terpene hydrocarbons above mentioned, but from five to twenty-five per cent of pine oil is also present therein.

The density, boiling range, and percentage of the distillate vary somewhat according to operating conditions. It may be desirable to redistill or to make several cuts in the distillate, and it is desirable to give the distillate an alkali wash.

In general, it may be stated that the specific gravity of the distillate at 15° C. is within the approximate range .85 to .89, with from sixty-five to ninety-five per cent distilling off below 185° C.

The high boiling residue amounts to from ten to thirty-five per cent of the original volume of pine oil. It has a specific gravity, at a temperature of 15° C., within the approximate range .94 to .99. It consists essentially of various constituents of the pine oil that have not been converted into the product above described, which I designate solvenol. The residue is adapted for use as an ingredient of disinfectants. Some of the constituents of the residue are more valuable than either pine oil, solvenol or turpentine. One of these more valuable constituents is borneol. Of these valuable constituents, borneol, at least, is not present in substantial proportion unless a mild dehydrating agent, such as a halogen of fuller's earth, is employed; and of these two agents, the halogen usually gives the larger yield. The borneol may be partially recovered by cooling the residue, with crystallization of the borneol. Additional borneol may be recovered by fractionation of the residue, followed by cooling of the fractions.

The halogen used as the dehydrating agent should be added to the pine oil in a proportion varying from .05 to 1.0 per cent. About 0.1% is usually preferred.

It will now be observed that by virtue of my invention not only is an efficient and economical method for the production of a turpentine substitute provided, but in addition borneol is produced in substantial proportion.

Having now fully described my invention, what I claim and declare to protect by Letters Patent is:

1. The process of producing a turpentine substitute from pine oil which includes dehydrating the pine oil with a halogen.

2. The process of securing a turpentine substitute and borneol from pine oil which includes adding a halogen to the pine oil, distilling off the hydrocarbons comprising the turpentine substitute, and separating the borneol from the residue.

3. The process of producing a turpentine substitute from pine oil which includes adding to the pine oil from not less than .05 per cent of iodin and distilling.

4. The process of securing borneol from pine oil which includes adding a halogen, distilling off a turpentine substitute and separating the borneol from the residue.

5. As a new article of manufacture, a neutral residual product of the dehydration of pine oil in liquid phase, having a specific gravity, at a temperature of 15° C., within the approximate range .94 to .99.

6. As a new article of manufacture, a neutral residual product of the dehydration of pine oil in liquid phase with iodin, having a specific gravity, at a temperature of 15° C., within the approximate range .94 to .99 containing a substantial proportion of borneol and which on distillation will produce a substantially neutral distillate.

7. The process of producing a turpentine substitute from pine oil which includes subjecting pine oil to treatment with a halogen and heat.

8. The process of producing a turpentine substitute from pine oil which includes subjecting pine oil to treatment with iodin and heat.

9. The process of producing a turpentine substitute from pine oil which includes adding a halogen to pine oil and distilling off the turpentine substitute.

10. The process of producing a turpentine substitute from pine oil which includes adding iodin to pine oil and distilling off the turpentine substitute.

In testimony of which invention, I have hereunto set my hand at Kenvil, N. J., on this 26th day of June, 1926.

IRVIN W. HUMPHREY.